United States Patent [19]

McCartney

[11] Patent Number: 5,319,480

[45] Date of Patent: Jun. 7, 1994

[54] LIQUID CRYSTAL HALF-TONE DISPLAY WITH GRAY LEVEL UNIFORMITY

[75] Inventor: Richard I. McCartney, Scottsdale, Ariz.

[73] Assignee: Honeywell Inc., Minneapolis, Minn.

[21] Appl. No.: 34,348

[22] Filed: Mar. 19, 1993

[51] Int. Cl.[5] .......................................... G02F 1/1343
[52] U.S. Cl. ......................................... 359/59; 359/87
[58] Field of Search .................... 359/59, 87, 58, 79

[56] References Cited

U.S. PATENT DOCUMENTS

| | | | |
|---|---|---|---|
| 4,840,460 | 6/1989 | Bernot et al. | 359/59 |
| 5,126,865 | 6/1992 | Sarma | 359/59 |

Primary Examiner—William L. Sikes
Assistant Examiner—Huy Mai
Attorney, Agent, or Firm—Seymour Levine; Dale E. Jepsen; Ronald Champion

[57] ABSTRACT

A half-tone liquid crystal display panel having half-tone pixels, each comprising a plurality of sub-pixels including first and second sub-pixels. Activation voltage is supplied to the first sub-pixel from a TFT switch and to the second sub-pixel from the TFT switch through a coupling capacitor. The second sub-pixel includes a storage capacitor. Sensitivity of the activation voltage applied to the second sub-pixel resulting from capacitance non-uniformity across the panel is reduced by forming the coupling capacitor and the storage capacitor of the second sub-pixel with the same depositions utilizing a common dielectric layer. The capacitance of the storage capacitor of the second sub-pixel is designed large compared to the capacitance of the second sub-pixel.

10 Claims, 3 Drawing Sheets

LIQUID CRYSTAL HALF-TONE DISPLAY WITH GRAY LEVEL UNIFORMITY

BACKGROUND OF THE INVENTION

1. Field of the Invention

The invention relates to displays particularly with respect to liquid crystal, half-tone displays. Such displays typically are of active matrix configuration.

2. Description of the Prior Art

Backlighted liquid crystal displays (LCD) utilizing twisted-nematic (TN) liquid crystal have been developed to provide flat panel displays for applications such as aircraft instrumentation, laptop and notebook computers, and the like. Such LCDs typically utilize a rear electrode structure in the form of a matrix of transparent metal pixels or dot electrodes and a continuous transparent metal front electrode with the liquid crystal material sandwiched therebetween. The front electrode is often denoted as the common or counter electrode. Each pixel electrode is activated through a switch, usually implemented as a thin film transistor (TFT), which is deposited as a field effect transistor (FET). The drain electrode of each TFT is connected to, or actually forms, the pixel electrode with which it is associated. The gate electrodes of the TFTs in each row of the matrix are commonly connected to a gate bus-line for the row and the source electrodes of the TFTs in each column of the matrix are commonly connected to a source bus-line for the column. An image is created in raster fashion by sequentially scanning the gate bus rows while applying information signals to the source bus columns.

Color capability is imparted to the LCD in a well known manner by providing suitable color filters at the front surface of the LCD to intercept the light transmitted through the respective pixels and appropriately addressing the pixels to display the desired colors. For example, delta shaped triads with primary color RED, GREEN and BLUE filters are often utilized. By appropriate video control of the gate and source buses, various colors are generated. In the conventional design, each pixel electrode has a storage capacitor connected thereto for supplementing the charge holding capacity of the pixel so as to retain the voltage on the pixel between refresh pulses.

As an improvement to the conventional display pixel described above, half-tone pixels are utilized to impart gray scale capability to the LCD. A particularly desirable half-tone panel arrangement is described in U.S. Pat. Nos. 4,840,460 and 5,126,865. Said U.S. Pat. No. 4,840,460, issued Jun. 20, 1989, is entitled "Apparatus And Method For Providing A Gray Scale Capability In A Liquid Crystal Display Unit". Said U.S. Pat. No. 5,126,865, issued Jun. 30, 1992, is entitled "Liquid Crystal Display With Sub-pixels". Said U.S. Pat. Nos. 4,840,460 and 5,126,865 are assigned to the Assignee of the present invention and are incorporated herein by reference in their entirety.

Briefly, a half-tone pixel is comprised of multiple sub-pixels with the activating TFT connected to a first one of the sub-pixels and with the remaining sub-pixels deriving their activation voltage from the TFT through respective coupling capacitors. As described in said U.S. Pat. Nos. 4,840,460 and 5,126,865, sub-pixels are selectively activated by controlling the activation voltage from the TFT to provide the gray scale capability. Conventionally, one or more of the half-tone sub-pixels has a storage capacitor associated therewith for the reasons described above with respect to the conventional pixel.

Although a half-tone pixel is often comprised of a first or primary sub-pixel with plural secondary sub-pixels, the following descriptions will be provided in terms of a liquid crystal display dot with two sub-pixels. The TFT activating voltage is applied directly to the primary sub-pixel and the second sub-pixel derives its activation voltage through its associated coupling capacitor. It is appreciated that the concepts and structures described herein with respect to the second sub-pixel also apply to the other secondary sub-pixels.

In the half-tone panel technology, the second sub-pixel voltage is derived from the first sub-pixel voltage as:

$$V_2 = V_1[C_c/(C_c + C_{s2} + C_{lc2})] \qquad (1)$$

where:
- $V_1$ = the first sub-pixel voltage
- $V_2$ = the second sub-pixel voltage
- $C_{s2}$ = capacitance of second sub-pixel storage capacitor
- $C_c$ = capacitance of coupling capacitor
- $C_{lc2}$ = capacitance of second sub-pixel.

A problem prevalent in the LCD half-tone display panel technology is achieving uniformity of gray levels across the panel. In order to provide acceptable gray level uniformity, the voltage relationship between the sub-pixels of a pixel should be independent of position on the panel. Quantitatively, $V_2/V_1$ should be position independent. It is appreciated from the above, that $V_2/V_1$ depends on $C_c$, $C_{lc2}$, and $C_{s2}$. $V_1$ is the primary voltage applied by the switches to the pixels and is substantially position independent over the panel. $C_{lc2}$ is also reasonably well controlled and position independent over the panel so as to obtain uniformity of background. Thus, it is seen that the secondary voltage $V_2$ is sensitive to variations in $C_c$ and $C_{s2}$.

It is desirable to make the sub-pixel voltages $V_2$ uniform over the panel. In the half-tone panel technology, however, the depositions that form $C_c$ and $C_{s2}$ are not uniform and capacitances formed can vary as much as $\pm 20\%$ across the panel. The non-uniformity across the panel is exacerbated when, for example, either $C_c$ or $C_{s2}$ is 20% larger and the other is 20% smaller. The variation is primarily caused by differences in dielectric thicknesses for the different depositions and the non-uniformity is exacerbated if $C_c$ is controlled by one deposition while $C_{s2}$ is controlled by another deposition permitting the tolerances to accumulate.

SUMMARY OF THE INVENTION

The sensitivity to $C_c$ and $C_{s2}$ of the secondary voltage, and thus the ratio $V_2/V_1$, in a liquid crystal half-tone display is reduced by forming $C_c$ and $C_{s2}$ with the same dielectric deposition and by making $C_{s2}$ large compared to $C_{lc2}$. An improvement of one order of magnitude is achieved by utilizing the invention.

DESCRIPTION OF THE PREFERRED EMBODIMENT

Figure 1:
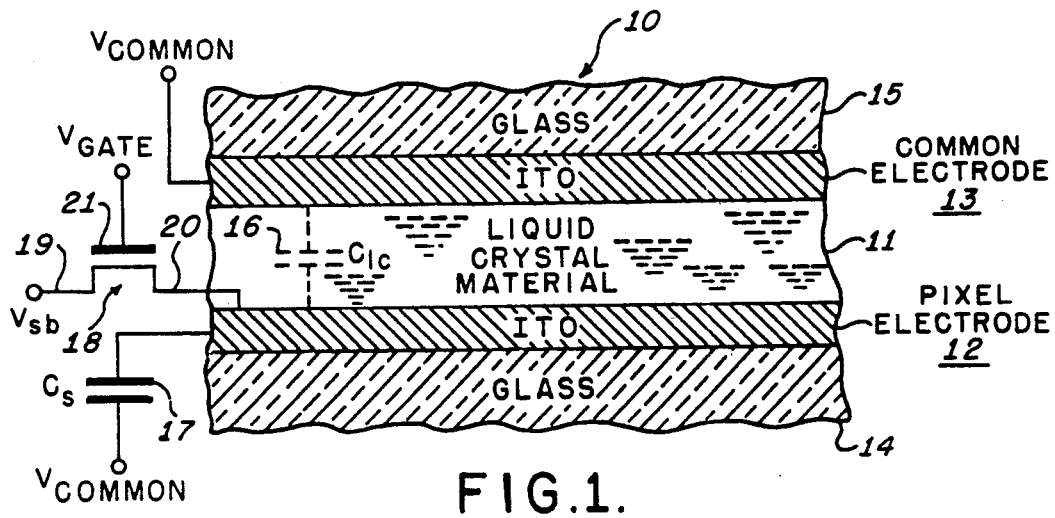
FIG. 1 is a schematic representation of a conventional display dot or pixel.

Referring to FIG. 1, the structure and electrical connections of a conventional display pixel 10 in a flat panel liquid crystal display is illustrated. The pixel 10 is comprised of liquid crystal material 11 sandwiched between a pixel electrode 12 and a common electrode 13. The electrodes 12 and 13 are comprised of a transparent conductor such as ITO and are deposited on respective glass substrates 14 and 15. The capacitance of the pixel 10 is schematically illustrated at 16. The pixel 10 has associated therewith a conventional storage capacitor 17 having a capacitance value of $C_s$. Although the storage capacitor 17 is illustrated in electrical schematic form, it is appreciated that the capacitor 17 is formed by layer depositions in the construction of the display panel.

The pixel 10 is driven by an active matrix TFT (thin film transistor) 18. The TFT 18 includes a source electrode 19, a drain electrode 20 and a gate electrode 21. The drain electrode 20 forms the pixel electrode 12 in a conventional manner. The TFT 18 is selectively energized by a source voltage $V_{sb}$ and a gate voltage $V_{gate}$ applied to the respective source and gate electrodes. Although the TFT 18 is illustrated in electrical schematic form, it is appreciated that the transistor is formed by layer depositions in the construction of the display panel.

Constructional details of the pixel 10 are described in U.S. patent application Ser. No. 07/850,174; filed Mar. 11, 1992, for E. S. Haim; entitled "Multigap Liquid Crystal Color Display With Reduced Image Retention And Flicker" and assigned to the assignee of the present application. Said Ser. No. 850,174 is incorporated herein by reference in its entirety. The manner in which the storage capacitor 17 and the TFT 18 are formed is described in said Ser. No. 850,174. For example, the storage capacitor 17 is formed by the capacitance between extensions of the electrode 12 and deposited gate buses or a separate $C_s$ bus.

Figure 1A:
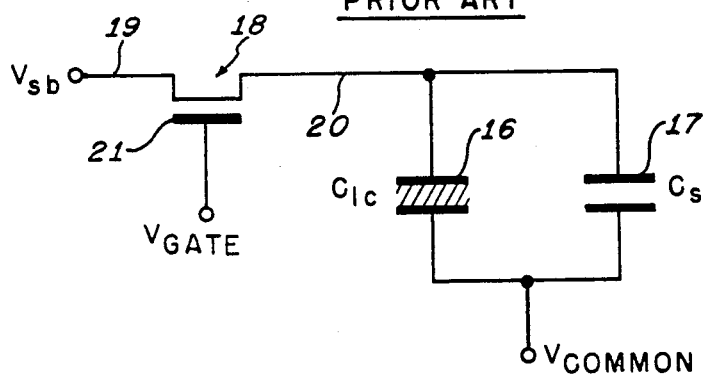
FIG. 1a is the equivalent circuit for the pixel of FIG. 1.

Referring to FIG. 1a, the equivalent circuit of the pixel 10 is illustrated. Like reference numerals are utilized to indicate like elements with respect to FIG. 1.

Figure 2:
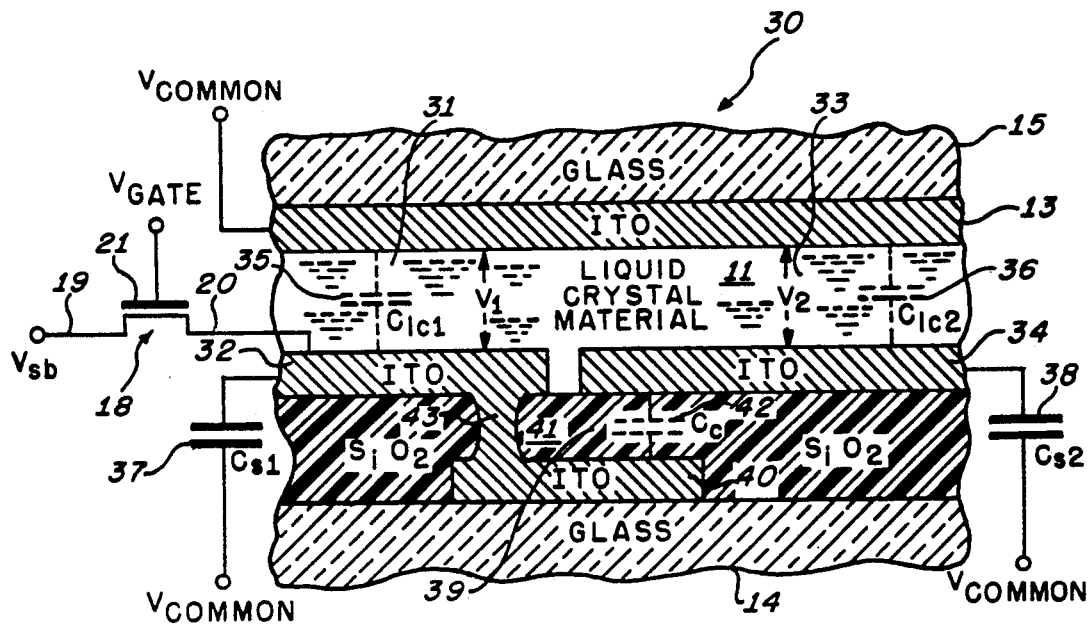
FIG. 2 is a schematic representation of a conventional half-tone display pixel.

Referring to FIG. 2, in which like reference numerals indicate like elements with respect to FIG. 1, a conventional half-tone pixel 30, showing two sub-pixels thereof, is illustrated. The pixel 30 is comprised of a primary sub-pixel 31 with a sub-pixel electrode 32 and a secondary sub-pixel 33 with a sub-pixel electrode 34. The sub-pixel 31 has a pixel capacitance of $C_{lc1}$ denoted by reference numeral 35 and sub-pixel 33 has a pixel capacitance of $C_{lc2}$ denoted by reference numeral 36. The sub-pixel 31 has a storage capacitor 37 associated therewith and the sub-pixel 33 has a storage capacitor 38 associated therewith. The capacitance values of the capacitors 37 and 38 are denoted as $C_{s1}$ and $C_{s2}$, respectively. The storage capacitors 37 and 38 may be formed in any conventional manner such as, for example, with respect to the gate bus-lines as described in said Ser. No. 850,174. Constructional details of the pixel 30 are described in said U.S. Pat. Nos. 4,840,460 and 5,126,865.

The primary sub-pixel 31 is driven by the TFT 18 in the manner described above with respect to FIG. 1. The TFT 18 applies a voltage $V_1$ across the sub-pixel 31. The sub-pixel 33 is driven by a voltage $V_2$ derived from $V_1$ through a coupling capacitor 39. The coupling capacitor 39 is formed by the sub-pixel electrode 34, a conductive member 40 and a dielectric layer 41. Preferably, the member 40 is comprised of ITO and the dielectric layer 41 is comprised of silicon dioxide. The capacitance value $C_c$ of the coupling capacitor 39 is schematically depicted at 42.

In construction, the ITO member 40 is deposited on the glass substrate 14 and a silicon dioxide layer, including the dielectric 41, is deposited thereover. A contact hole 43 is formed in the silicon dioxide layer. The ITO electrodes 32 and 34 are then deposited on the silicon dioxide layer with the electrode 32 making electrical contact with the member 40 through the contact hole 43.

Figure 2A:
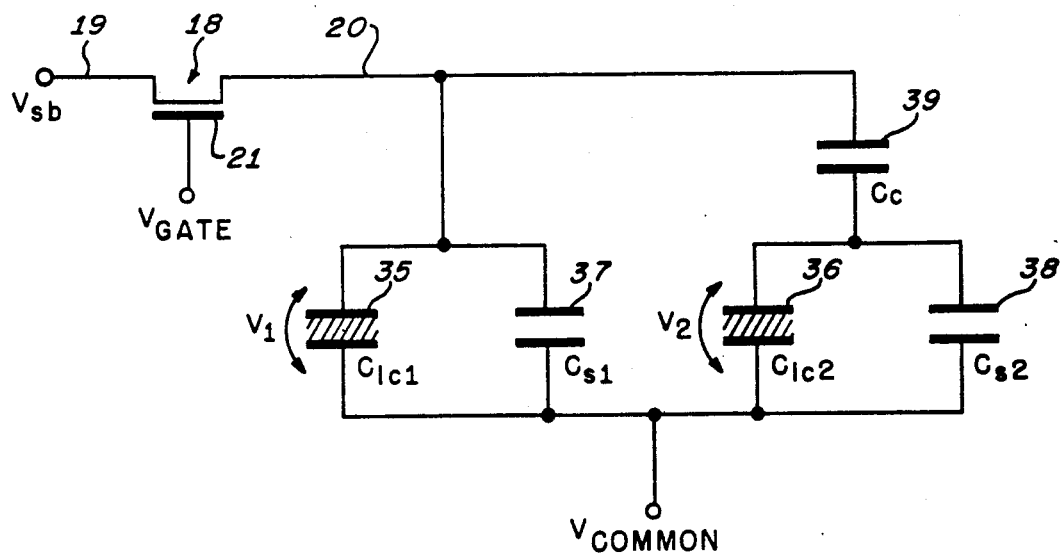
FIG. 2a is the equivalent circuit for the pixel of FIG. 2.

Referring to FIG. 2a, the equivalent circuit of the pixel arrangement of FIG. 2 is illustrated. Like reference numerals are utilized to indicate like elements with respect to FIG. 2. The above equation (1) indicates how $V_2$ is derived from $V_1$ through the capacitance network illustrated in FIG. 2a. It is appreciated from FIG. 2 that the non-uniform tolerances in forming the capacitors 38 and 39, as discussed above, result in an unacceptable variation in gray level uniformity across the display panel.

In accordance with the invention, the sensitivity of the $V_2/V_1$ ratio to variations in $C_c$ and $C_{s2}$ is minimized if $C_c$ and $C_{s2}$ depend on the same deposition and if $C_{s2}$ is large compared to $C_{lc2}$. $C_c$ is coupled to $C_{s2}$ by utilizing the same dielectric layer for both capacitors. In a local region, there is negligible variation of dielectric thickness. When both capacitors utilize the same dielectric, sensitivity is reduced by one order of magnitude into an acceptable range.

It is appreciated, therefore, that by constructing $C_c$ and $C_{s2}$ in the same dielectric deposition, $V_2$ is rendered insensitive to variations in the thickness of the dielectric. This is because $V_2$ depends to a larger extent on the ratio of $C_c$ to $C_{s2}$ than to the absolute values of either capacitor. This effect is enhanced the larger $C_{s2}$ and $C_c$ are compared to $C_{lc2}$. Preferably, $C_{s2}$ should be at least five times larger than $C_{lc2}$.

These effects are appreciated by rewriting equation (1) and examining the equation for sensitivity to $C_{s2}/C_c$ variations as follows:

$$V_2/V_1 = 1/[(C_{s2}/C_c) + (C_{lc2}/C_c) + 1] \tag{2}$$

In accordance with the invention, the ratio $C_{s2}/C_c$ is rendered position independent if $C_c$ and $C_{s2}$ are formed with the same deposition.

As discussed above, $C_{lc2}$ is position independent whereas $C_c$ is position dependent. When $C_{s2}$ is large compared with $C_{lc2}$, then it will be required that $C_c$ be correspondingly large to preserve the desired $V_2/V_1$ ratio, where $V_2$ is a design parameter. When $C_{s2}$ is large compared with $C_{lc2}$, the ratio of $C_{lc2}$ to $C_c$ becomes less significant and $V_2/V_1$ depends less on position.

By the above-described implementation of the present invention, the ratio $V_2/V_1$ is rendered position independent across the display panel.

Figure 3:
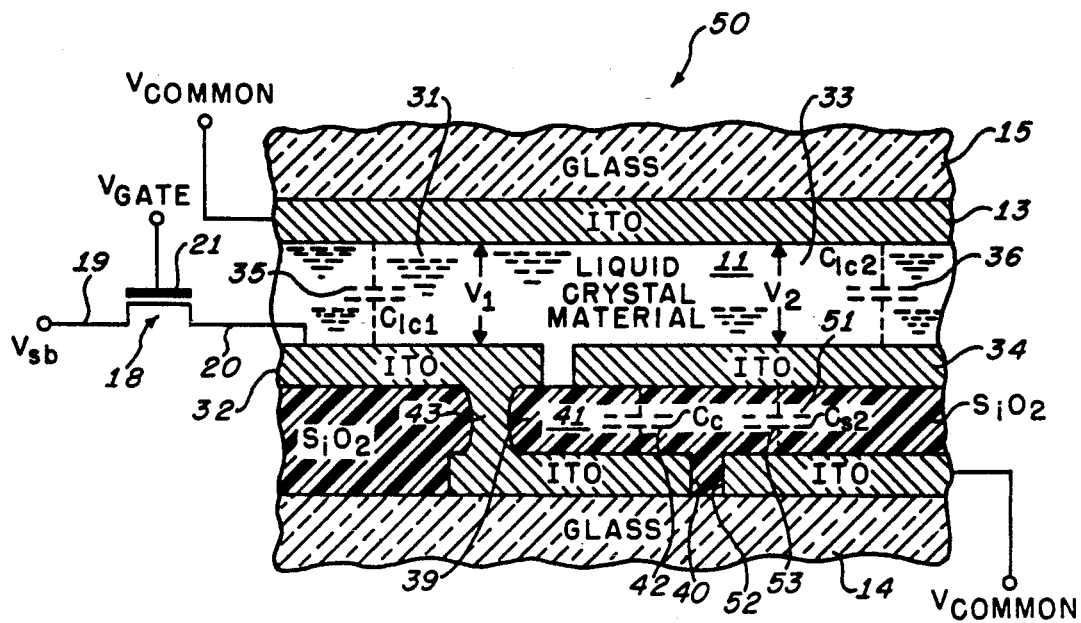
FIG. 3 is a schematic representation of a half-tone pixel constructed in accordance with the present invention.

Referring to FIG. 3, in which like reference numerals indicate like elements with respect to FIG. 2, a half-tone pixel 50 showing two sub-pixels thereof, configured in accordance with the present invention, is illustrated. In accordance with the invention, the storage capacitor for sub-pixel 33 is implemented by a capacitor 51. The capacitor 51 is formed from the electrode 34 and an electrically conductive member 52 with the silicon dioxide layer 41 sandwiched therebetween. Preferably, the member 52 is comprised of ITO. The storage capacitor 51 has a capacitance value of $C_{s2}$ as schematically represented at 53.

In construction of the pixel 50, the members 40 and 52 are deposited on the glass substrate 14 and the silicon dioxide layer, including the dielectric 41, is deposited thereover. The electrodes 32 and 34 are then deposited on the silicon dioxide layer. In this manner, the coupling capacitor 39 and the storage capacitor 51 are formed in the same deposition utilizing the same dielectric layer 41.

Further in accordance with the invention, the capacitance 53 is large compared to the capacitance 36 with a correspondingly large value for the capacitance 42 to preserve the desired $V_2/V_1$ ratio.

Figure 3A:
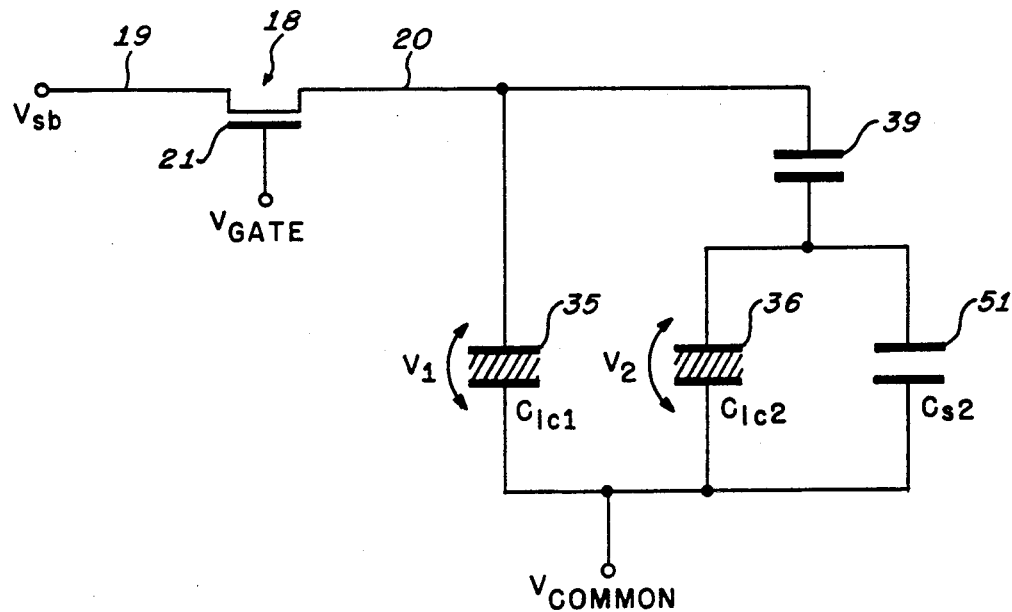
FIG. 3a is the equivalent circuit for the pixel of FIG. 3.

FIG. 2a with the modifications described below, applies to FIG. 3. Referring again to FIG. 2a with continued reference to FIG. 3, it is noted that FIG. 3 does not expressly include a storage capacitor for pixel 31, such as the capacitor 37 of FIG. 2a. For reference to FIG. 3, FIG. 2a is considered modified as not including the storage capacitor 37, and designating the storage capacitor for the secondary sub-pixel 33 by reference numeral 51 instead of reference numeral 38. The modified circuit, which is the equivalent circuit for the half-tone pixel of FIG. 3, is shown in FIG. 3a. The elements 36, 39 and 51 function in the manner described above with respect to FIG. 3. The storage capacitor 37 ($C_{s1}$) can be eliminated because the capacitive network comprising the elements 36, 39 and 51 also function as the storage capacitor for the primary sub-pixel 31. It is appreciated from equation 2 above, that the stability of $V_2/V_1$ does not depend on the storage capacitance $C_{s1}$ of the primary sub-pixel 31. In the modified arrangement described, the elements 36, 39 and 51 perform the multiple purposes of the functionality previously described and the functionality of providing the storage capacitance for the primary sub-pixel 31. This arrangement retains the position independent stability described above by utilization of the present invention and by reason of the position independence of $C_{s1}$. The described arrangement can be extended as illustrated in FIG. 4.

Figure 4:
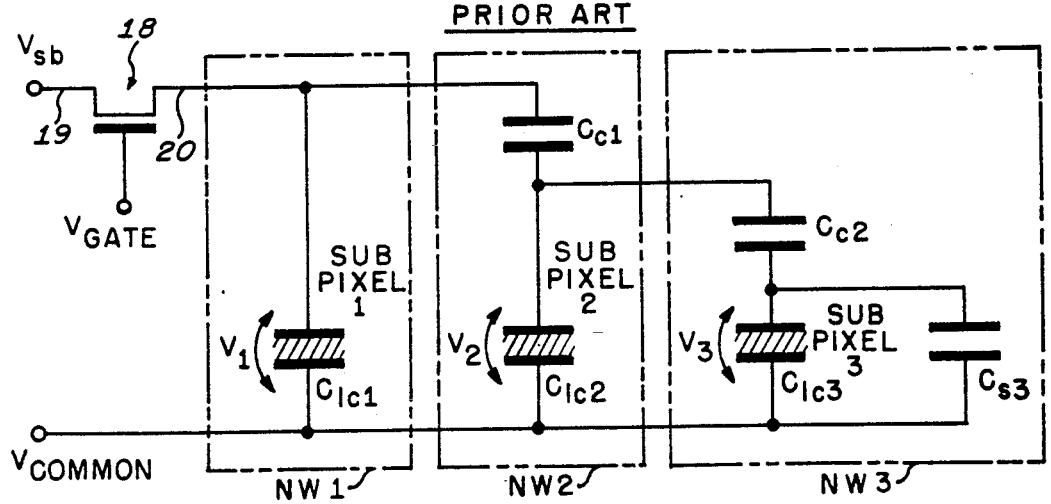
FIG. 4 is an equivalent circuit representation of a half-tone pixel with three sub-pixels advantageously intercoupled and utilizing the construction of the present invention.

Referring to FIG. 4, three sub-pixels are illustrated where sub-pixel 1 is the primary sub-pixel and sub-pixels 2 and 3 are the secondary sub-pixels. In FIG. 4, $V_1$ is derived directly from the transistor switch 18, $V_2$ is derived through coupling capacitor $C_{c1}$, and $V_3$ derived from $V_2$ through coupling capacitor $C_{c2}$. Sub-pixel 3 has storage capacitor $C_{s3}$ connected thereacross. The components associated with sub-pixels 1, 2 and 3 are denoted as NW1, NW2 and NW3, respectively, where NW denotes respective capacitive networks as illustrated. It is appreciated that sub-pixels 1 and 2 do not utilize separate storage capacitors. NW3 functions as the storage capacitor for sub-pixel 2, and NW3 together with NW2, function as the storage capacitor for sub-pixel 1.

For reasons similar to those discussed above, the stability of $V_3$ to $V_2$ is primarily dependent on the ratio of $C_{c1}$ to NW3. NW3 is rendered position independent by utilization of the invention as described above by forming $C_{c2}$ and $C_{s3}$ in the same deposition. The ratio of $V_2$ to $V_1$ is rendered position independent by fabricating $C_{c1}$ in the same deposition as $C_{c2}$ and $C_{s3}$. Thus, by utilizing the present invention, the stability of the multiple sub-pixel arrangement of FIG. 4 is rendered position independent.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A half-tone pixel in a liquid crystal display, said half-tone pixel having a plurality of sub-pixels including first and second sub-pixels, comprising
   a switch for applying an activation signal to said first sub-pixel,
   a first coupling capacitor for coupling said activation signal from said switch to said second sub-pixel, said first coupling capacitor having a first coupling capacitor dielectric, and
   a storage capacitor coupled to said second sub-pixel, said storage capacitor having a storage capacitor dielectric,
   said first coupling capacitor dielectric and said storage capacitor dielectric being formed as a common dielectric layer of substantially uniform thickness.

2. The pixel of claim 1 wherein said second sub-pixel has a capacitance and said storage capacitor has a capacitance,
   said storage capacitor and said second sub-pixel being constructed and arranged so that said capacitance of said storage capacitor is significantly larger than said capacitance of said second sub-pixel.

3. The pixel of claim 1 wherein said second sub-pixel has a capacitance and said storage capacitor has a capacitance,
   said storage capacitor and said second sub-pixel being constructed and arranged so that said capacitance of said storage capacitor is at least five times larger than said capacitance of said second sub-pixel.

4. The pixel of claim 1 wherein
   said activation signal applied to said first sub-pixel comprises a first sub-pixel voltage,
   said activation signal applied to said second sub-pixel comprises a second sub-pixel voltage,
   said second sub-pixel has a capacitance, and
   said second sub-pixel voltage is related to said first sub-pixel voltage as follows:

$$V_2/V_1 = 1/[(C_{s2}/C_c) + C_{lc2}/C_c) + 1]$$

where:
$V_1$ = said first sub-pixel voltage
$V_2$ = said second sub-pixel voltage
$C_{s2}$ = capacitance of said storage capacitor
$C_c$ = capacitance of said first coupling capacitor
$C_{lc2}$ = said capacitance of said second sub-pixel.

5. The pixel of claim 4 wherein said second sub-pixel has a capacitance and said storage capacitor has a capacitance, said storage capacitor and said second sub-pixel being constructed and arranged so that said capacitance of said storage capacitor is significantly larger than said capacitance of said second sub-pixel with $C_c$ being correspondingly large to preserve the $V_2/V_1$ ratio.

6. The pixel of claim 1 further including a plurality of coupling capacitors, including said first coupling capacitor, for coupling said activation signal from said switch to said second sub-pixel, said plurality of coupling capacitors having a respective plurality of coupling capacitor dielectrics, including said first coupling capacitor dielectric, said plurality of coupling capacitor dielectrics and said storage capacitor dielectric being formed as a common dielectric layer of substantially uniform thickness.

7. The pixel of claim 6 wherein said plurality of coupling capacitors comprise a plurality of serially connected coupling capacitors for coupling said activation signal from said switch to respective ones of said plurality of sub-pixels.

8. In a half-tone liquid crystal display having a half-tone pixel, said half-tone pixel having a plurality of sub-pixels including first and second sub-pixels, said second sub-pixel having a storage capacitor associated therewith, said display including a switch for applying an activation signal to said first sub-pixel, said half-tone pixel including a first coupling capacitor for coupling said activation signal from said switch to said second sub-pixel; a method for reducing sensitivity of said activation signal coupled to said second sub-pixel, comprising forming said first coupling capacitor and said storage capacitor with a common dielectric layer of substantially uniform thickness.

9. The method of claim 8 further comprising forming said storage capacitor with a capacitance substantially greater than the capacitance of said second sub-pixel.

10. The method of claim 8 wherein said half-tone pixel further includes a plurality of coupling capacitors, including said first coupling capacitor, for coupling said activation signal from said switch to said second sub-pixel, said method further comprising forming said plurality of coupling capacitors and said storage capacitor with a common dielectric layer of substantially uniform thickness.

* * * * *